(12) United States Patent
Fliege

(10) Patent No.: US 6,725,993 B2
(45) Date of Patent: Apr. 27, 2004

(54) CONNECTING ARRANGEMENT FOR A CLUTCH-RELEASE MECHANISM

(75) Inventor: Hans Fliege, Theres (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/230,943

(22) Filed: Aug. 29, 2002

(65) Prior Publication Data
US 2003/0047409 A1 Mar. 13, 2003

(30) Foreign Application Priority Data
Sep. 8, 2001 (DE) ......................... 101 44 162

(51) Int. Cl.⁷ ................. F16D 25/08; F16D 23/12
(52) U.S. Cl. ............... 192/85 CA; 192/30 W; 192/91 A; 192/115
(58) Field of Search ............ 192/85 CA, 91 A, 192/98, 30 W, 115; 403/24, 39, 349; 396/532; 285/148.2; 359/828; 439/195, 315, 318

(56) References Cited
U.S. PATENT DOCUMENTS

| | | | | |
|---|---|---|---|---|
| 3,990,727 A | * | 11/1976 | Gallagher | 285/148.2 |
| 4,448,509 A | * | 5/1984 | Katsuma et al. | 396/532 |
| 4,739,356 A | * | 4/1988 | Ogura et al. | 396/532 |
| 5,205,387 A | * | 4/1993 | Checa | 192/85 CA |
| 5,507,585 A | * | 4/1996 | Diederich et al. | 403/349 |
| 5,678,646 A | * | 10/1997 | Fliege | 180/65.1 |
| 5,810,145 A | * | 9/1998 | Thomire | 192/85 CA |
| 6,540,059 B2 | * | 4/2003 | Drexl | 192/85 CA |
| 6,588,558 B2 | * | 7/2003 | Otto et al. | 192/98 |

\* cited by examiner

Primary Examiner—Rodney H. Bonck
(74) Attorney, Agent, or Firm—Cohen, Pontani, Lieberman & Pavane

(57) ABSTRACT

A connecting arrangement for a clutch-release mechanism which is concentric with respect to a longitudinal axis of a clutch arrangement includes a connecting line, which can be connected to the clutch-release mechanism for the purpose of control, and a fastening device for the detachable connection of the clutch-release mechanism to a support element by relative rotation between the clutch-release mechanism and the support element.

29 Claims, 6 Drawing Sheets

CONNECTING ARRANGEMENT FOR A CLUTCH-RELEASE MECHANISM

BACKGROUND OF THE INVENTION

1. Field of the Invention

The present invention pertains to a connecting arrangement for a clutch-release mechanism of a clutch arrangement, where the clutch-release mechanism is concentric with respect to a longitudinal axis of the clutch arrangement, and where at least one connecting line, which can be connected to the clutch-release mechanism for the purpose of control, and a fastening means for the detachable connection of the clutch-release mechanism to a support element are provided.

2. Description of the Related Art

The friction clutches of motor vehicles are usually premounted on the engine, while the associated clutch-release device is initially mounted on the transmission to form a unit. This attachment to the transmission casing can be accomplished with threaded bolts, for example, but this is time-consuming. In addition, the mounting of clutch-release mechanisms concentrically to a rotational or longitudinal axis of the clutch arrangement requires special tools in order to ensure a precise fit.

SUMMARY OF THE INVENTION

One of the objects of the present invention is to provide a connecting arrangement for a clutch-release mechanism of a clutch arrangement by means of which the clutch-release mechanism can be mounted easily and precisely on a support element.

According to the present invention, this object is achieved by fastening means wherein the connection can be produced and released by relative rotation between the clutch-release mechanism and the support element, in the manner of known turn-lock or quarter-turn fasteners.

According to the invention, it is possible for the fastening means to comprise one or a plurality of vanes on the clutch-release mechanism or on the support element to cooperate with a corresponding number of vane-receiving elements on the other element, i.e., the support element or the release mechanism. As a result of this design it is possible, before the fastening means are connected on the release mechanism side, to premount the fastening means on the support element side with an accurate fit without the danger of damage to the release mechanism or to the associated connecting line and only then to attach the release mechanism by means of a simple relative rotation. In addition, this type of attachment offers the additional advantage that the means used to attach the fastening means on the support element side to the support element can also be designed in such a way that, after the release mechanism has been mounted, there is no longer any access to the fastening means, i.e., that the fastening means are completely covered on the support element side by the release mechanism.

According to a preferred embodiment, it is possible for the vanes to be arranged on the release mechanism and for them to be designed preferably as an integral part of that mechanism. For example, an area of a cylinder of the release mechanism can be made from a single piece of sheet metal, on which the vanes are formed. This allows low-cost production.

To avoid turning the fastening means too far when fastening it and to avoid damage to the fastening means, at least one vane-receiving element can have a circumferential stop.

It is also possible for at least one vane-receiving element to comprise a securing means for holding the associated vane in the vane-receiving element. This prevents the clutch-release mechanism from coming loose during operation. Securing screws, latching hooks, stop springs, cotter pins, etc., could be used as securing means, for example.

The clutch-release mechanism preferably comprises a pneumatically or hydraulically actuated piston-cylinder arrangement, where at least one fluid connecting line serves to connect the piston-cylinder arrangement.

In addition, the clutch-release mechanism can also comprise a sensor system, where at least one sensor connecting line serves to connect the sensor system. A sensor system of this type can be necessary especially when the clutch-release mechanism is intended for use in an automated transmission in which a control unit controls not only the transmission but also the release mechanism. The sensor system serves here to record the data required by the control unit such as the clutch release distance, the torque, the transmission input speed, etc. It can also be advantageous, however, for the release mechanism to have sensors even if the transmission is not automated.

It can also be advantageous according to the invention for the minimum of one connecting line to have a connecting means for cooperating with a corresponding opposing connecting means of the release mechanism. Connecting lines are to be understood here as, for example, the compressed air or hydraulic oil feed lines required for actuating the piston-cylinder assembly of the clutch-release mechanism and the electrical lines required for transmitting the electrical signals of the sensor system or for controlling, for example, a release solenoid.

It is advantageous in this case for the connecting means and the opposing connecting means to be designed in such a way that their working connection is brought about by the rotational movement required to produce the fastening effect. In contrast to the state of the art, therefore, there is no need for an additional work step to connect the lines; on the contrary, this connection is accomplished automatically, as it were, when the clutch-release mechanism is attached to the associated support element.

To prevent damage to or contamination of the connecting means and the opposing connecting means during operation, the connecting means and opposing connecting means can be provided in the contact area between the release mechanism and the support element. But because there is only a small amount of space available here to hold the connecting means and the opposing connecting means, the sensor connecting line can be designed as a sheathed, flexible conductive track. A sheathed, flexible conductive track has the advantages of being extremely flat, mechanically sturdy, producible by injection molding, easily brought into contact with electroplated areas, and obtainable at low cost. To ensure good electrical transmission at the contact points, the connecting means for connection of the sensor system can have electrical spring contacts. It is also conceivable, however, to use other types of contacts capable of establishing the required connections.

To protect the connecting means and opposing connecting means from contamination before installation, the minimum of one connecting means or opposing connecting means can be provided with a sealing mechanism, which covers the connecting means or opposing connecting means before the connection is established. The sealing mechanism can comprise, for example, a protective cover in the form of a swiveling shutter or a slider, which is opened by hand before assembly to allow the connection to be established. Preferably, however, the sealing mechanism is opened by the same rotation as that which produces the fastening effect. The sealing mechanism can be provided with, for example, a restoring spring, so that, when the fastening effect of the fastening means is released, the sealing mechanism returns automatically to its starting position and covers the connecting means or opposing connecting means.

Alternatively or in addition, however, the sealing mechanism can comprise a protective film, which is peeled off before the fastening effect is produced. In addition, a cover for the sealing mechanism can also be provided to cover at least an area of the sealing mechanism on the contact side when the mechanism is open. As a result of this design, it is guaranteed that the connecting means or opposing connecting means, which, after the removal of the clutch-release mechanism, must be covered again, cannot be impaired by dirt adhering to the sealing mechanism.

It is also possible to provide a sealing arrangement, preferably a labyrinth sealing arrangement, which seals off the adjacent areas of the clutch-release mechanism and the support element after the fastening effect has been produced. As a result, it is not only possible to prevent contamination of the connecting means, the opposing connecting means, and the sealing mechanism, but also to exclude almost completely the intrusion of dirt into, for example, the sensor system.

To avoid a multiplicity of parts, it is possible for the parts of the fastening means on the support element side and at least some of the parts of the minimum of one connecting line to be designed to form a single assembly. Like an intermediate ring or adapter, this assembly can ensure that different transmissions with different end profiles can be equipped with the same clutch-release mechanism.

The invention also pertains to a clutch system comprising a friction clutch and a clutch-release mechanism for the clutch, where the release mechanism is attached to a support element by means of a connecting arrangement according to the invention.

The present invention is described in greater detail below on the basis of preferred exemplary embodiments with reference to the attached drawings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
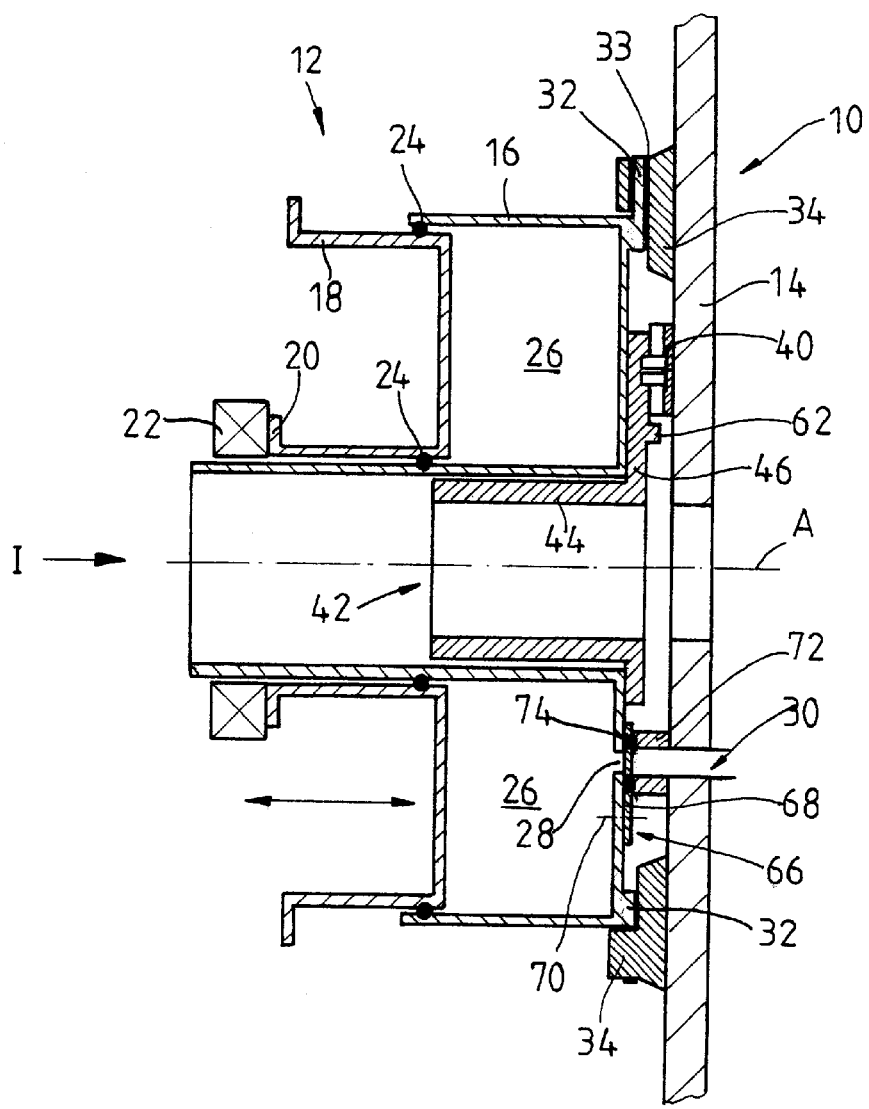
FIG. 1 shows a longitudinal section through a connecting arrangement according to the invention for a clutch-release mechanism.

FIGS. 1–4 show a first embodiment of a connecting arrangement 10 according to the invention. This connecting arrangement 10 has the purpose of detachably connecting a clutch-release mechanism 12 for actuating a clutch arrangement (not shown) to the end wall 14 of the transmission on the clutch side. The clutch-release mechanism 12 consists essentially of a ring-shaped piston 18, guided in a ring-shaped cylinder 16, the piston being supported on a clutch-release bearing 22 by way of a radially oriented inner flange 20. The piston 18 is sealed off with respect to the cylinder 16 by seals (O-rings) 24, seated in circumferential grooves in the cylinder 16 on the side facing the piston, and cooperates with the cylinder 16 to enclose a pressure space 26. On the transmission end, the cylinder 16 has an opening 28, which is connected to a fluid connecting line 30. The clutch-release mechanism 12, as can be seen in FIG. 1, is mounted so that it is concentric to a axis of rotation A of the clutch arrangement.

As can be seen in FIG. 1, the cylinder 16 has radially outward-projecting vanes 32, formed as an integral part of it, on the end facing the transmission. These vanes work together with a corresponding number of vane-receiving elements 34, which are, for example, screwed to the end wall 14 of the transmission and which function according to the principle of a quarter-turn fastener. The elements to be connected are first brought together over a short distance in the axial direction without any rotational movement and then, by means of a rotational movement, connected to each other in a form-locking manner. Guide bevels (not shown) can be provided on the vanes 32 and/or on the vane-receiving elements 34 to produce relative movement in the axial direction of the elements to be connected simultaneously with the rotational movement. After this rotational movement by a defined angle around the axis of rotation A in the direction indicated by the arrow 36 (FIG. 2), the vanes 32 are received in a form-locking manner in the associated vane-receiving slots 33 of the vane-receiving elements 34. Stop elements (not shown) can be provided to limit the rotational movement of the vanes 32 in the vane-receiving elements 34.

To ensure the permanent fixation of the vanes 32 in their associated end positions even under operating conditions, the vane-receiving elements 34 are provided with holes 38 for securing screws (not shown); when these screws are screwed into the associated holes 38, they also pass through the vanes 32. It is also conceivable, however, that other securing means such as latching hooks, stop springs, cotter pins, etc., could be used instead.

As a result of the design of the vanes 32 and the vane-receiving elements 34, the cylinder 16 is a certain distance away from the surface of the end wall 14 of the transmission, as can be seen in FIG. 1. As an alternative, it is conceivable that this gap could be completely eliminated; that is, by designing the vane-receiving elements 34 and the associated connectors appropriately, the vanes could slide directly on the end wall 14 of the transmission.

Figure 2:
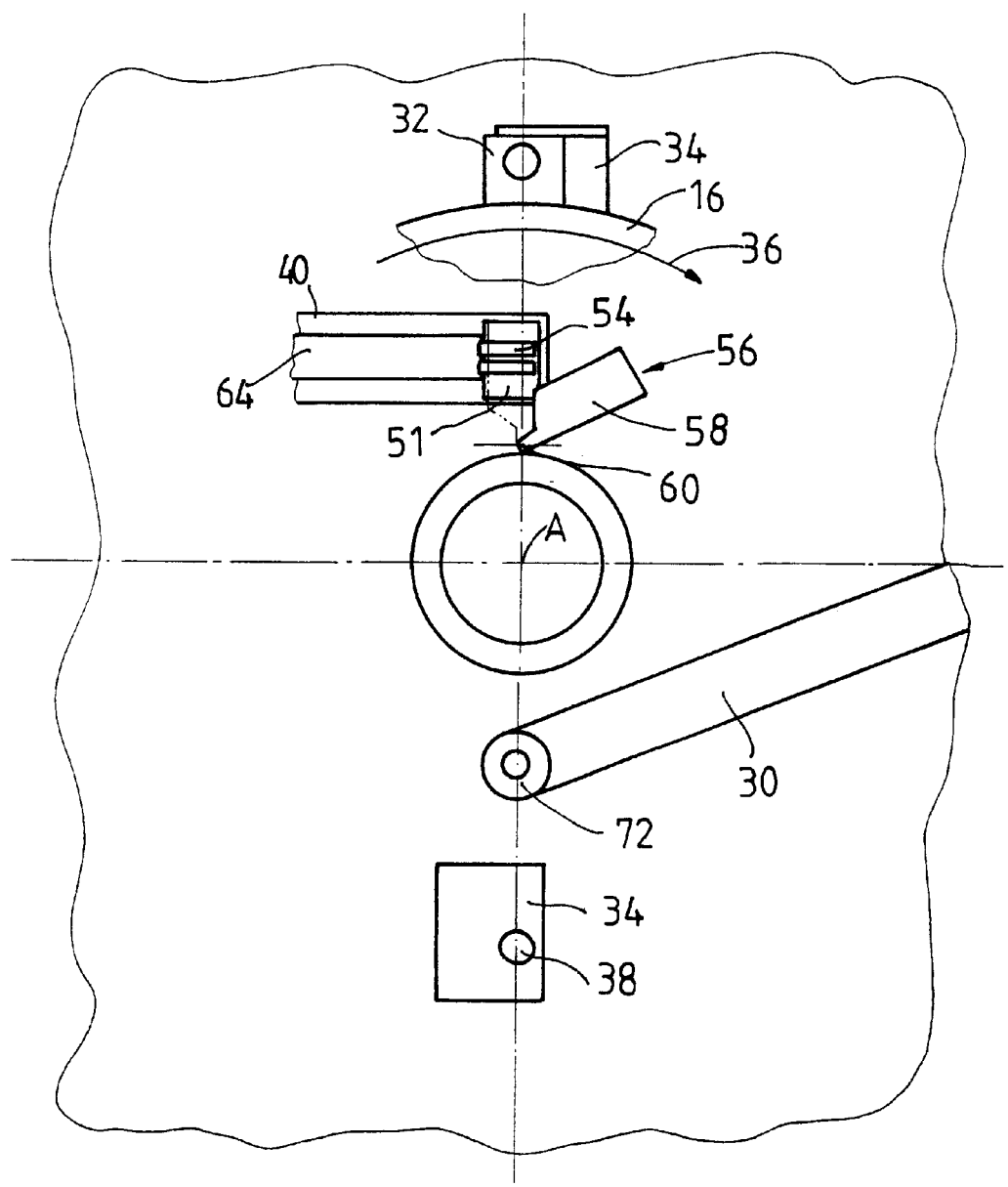
FIG. 2 shows a schematic end view of the connecting arrangement in direction I of FIG. 1, showing the arrangement of the connecting means after the removal of the release mechanism.
Figure 3:
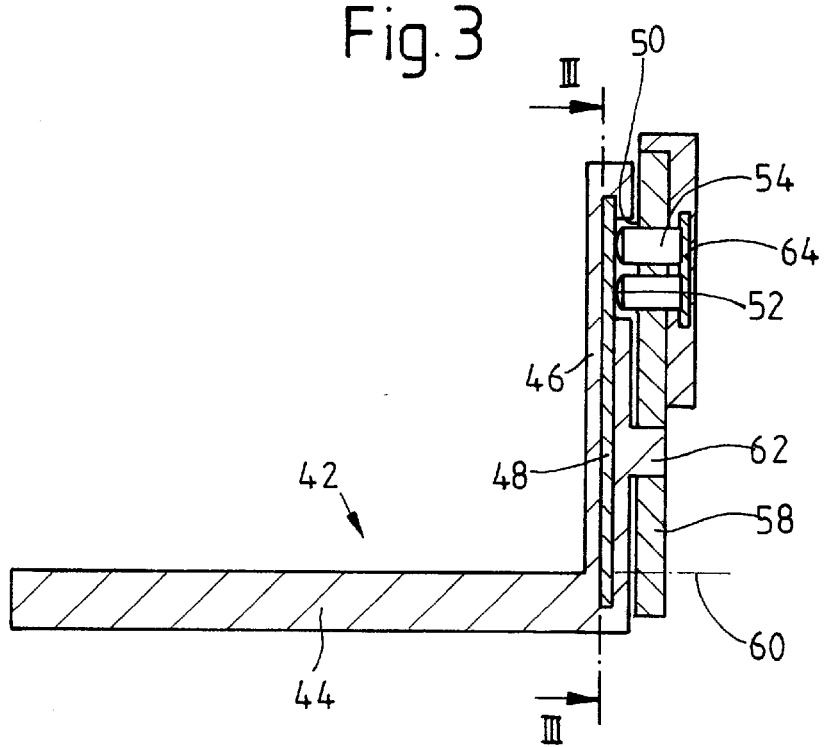
FIG. 3 shows a detailed view of an electrical interface and of the sensor system of FIG. 1.
Figure 4:
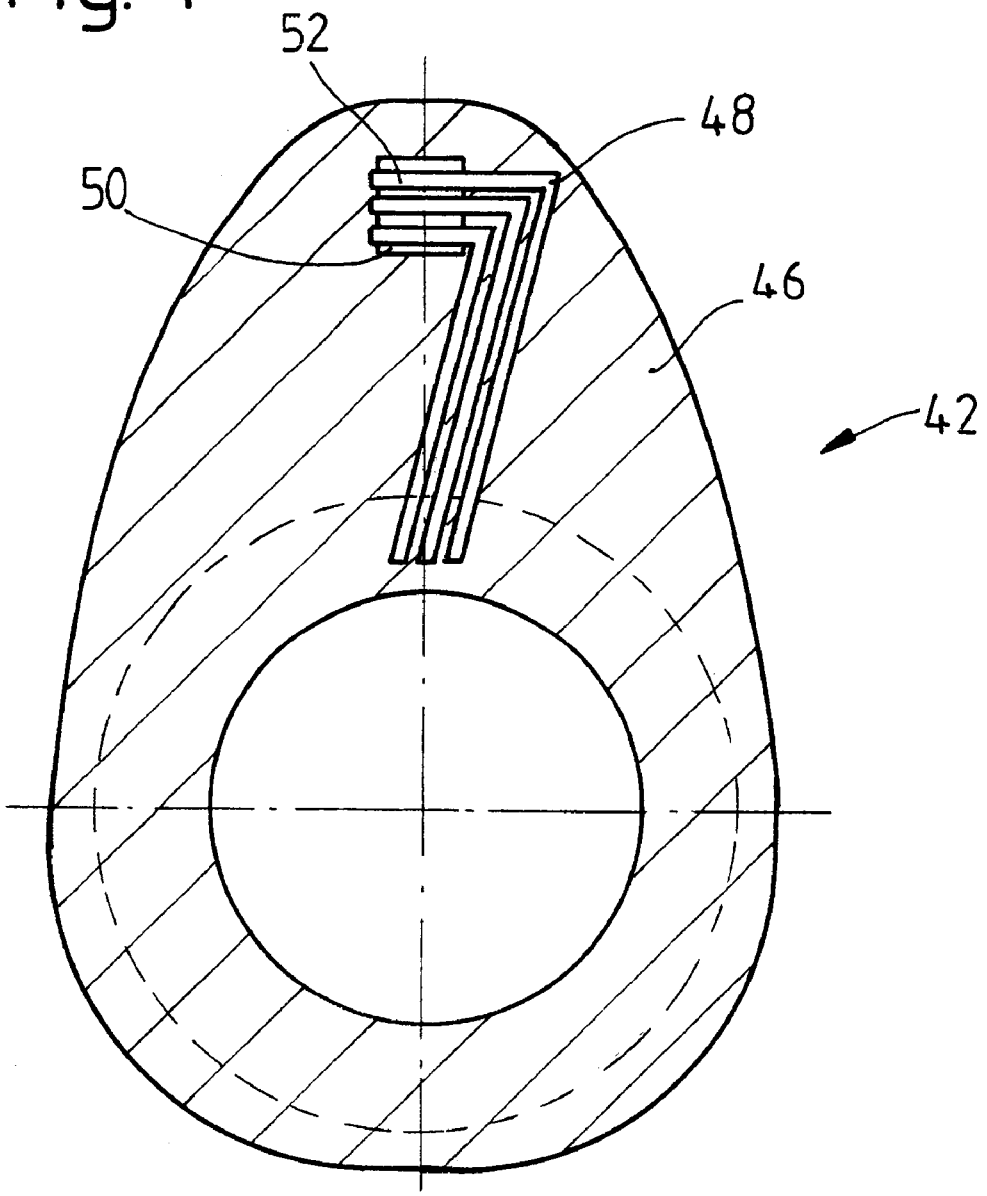
FIG. 4 shows a cross section of the sensor system and of the opposing connecting means along line III—III of FIG. 3.

As can be seen in FIGS. 1 and 2, two separate connecting lines are provided, namely, the previously mentioned fluid connecting line 30 for making the connection with the pressure space 26, and a sensor connecting line 40 for making the connection with the sensor system 42. As illustrated in FIGS. 1 and 3, the sensor system 42 comprises a section of tubing 44, concentric to the axis of rotation A, which is connected on the transmission side to a radially outward-projecting collar 46. The collar 46 can be circular or, as shown in FIG. 4, it can bulge out on one side. The sensor system 42 is permanently joined to the cylinder 16, preferably in the area of the collar 46, by screws, by adhesives, by latching mechanisms, etc. Sensor elements (not shown), which in the known manner record data concerning, for example, the displacement of the clutch-release mechanism 12 or the rotation of a transmission input shaft (not shown) passing through the tubular section 44, are located in the tubular section 44.

A flexible conductive track 48, sheathed on all sides, extends through the collar segment 46 to carry the electrical signals. This flexible conductive track 48 is a printed circuit with conductive traces as known in electronic engineering and combines the advantages of an extremely flat design, high mechanical load capacity, extrusion coatability, good contactability with electroplated areas, and low cost. As can be derived from FIGS. 3 and 4, the sheathing has an opening at a point 50 on the transmission side, at which the electroplated contact points 52 of the flexible conductive track 48 can be reached by the electrical spring contacts 54 of the sensor connecting line 40. The sensor connecting line 40, which is permanently attached to the end wall 14 of the transmission and which extends from the electrical spring contacts 54 between the cylinder 16 and the transmission end wall 14 to the outside edge of the transmission end wall 14, also comprises a flexible conductive track 64, which is sheathed or extrusion coated on all sides; the previously mentioned electrical spring contacts 54, which project out from an opening 51 in the sheathing when in the unloaded state, are provided at the sensor end of the track. During the rotational movement required to install the clutch-release mechanism 12, the contact points 52 of the flexible conductive track 48 are brought into contact with the spring contacts 54 of the sensor connecting line 40; that is, the spring contacts 54 enter the opening 50 in the collar 46 and thus establish the electrical connection with the contact points 52. The precision with which this contact is established is ensured by the quarter-turn principle between the clutch-release mechanism 12 and the transmission end wall 14.

To protect the open contact points 52 and the electrical spring contacts 54 before assembly, a sealing mechanism can be provided. In the simplest case, this mechanism is a protective film (not shown), which can be peeled off before assembly. This film can be attached, for example to the exposed location 50 on the transmission side to protect the contact points 52. For the protection of the electrical spring contacts 54, which are preloaded in the direction toward the contact points 52, however, it is necessary to provide a sealing mechanism 56, which comprises a protective cover 58, which can swivel around a center of rotation 60. To open the protective cover 58, the collar 46 has a projection 62, which comes to rest against the protective cover 58 during the installation of the clutch-release mechanism 12 and rotates this cover around the center of rotation 60 into the open position shown in FIG. 2 during the relative rotation between the clutch-release mechanism 12 and the transmission end wall 14 to produce the fastening effect. As an alternative, it is also conceivable that the sealing cover could be designed to slide in a straight line.

To exclude the possibility of impairment to the sealing mechanism 56 by the effects of dirt on the clutch side after the mechanism has been opened, a cover or pocket (not shown) can be provided, into which the sealing cover 58 can fit when it is opened.

As illustrated schematically in FIG. 1, the opening 28 of the cylinder 16 also comprises a sealing mechanism 66 with a protective cover 68, which, when the fastening effect is produced, is deflected around the center of rotation 70 by the action of a tubular piece 72 of the fluid connecting line 30, as a result of which the opening 28 is exposed. In addition, the tubular piece 72 has an O-ring 74 in the area where it comes in contact with the cylinder 16 to seal off the connecting area between the tubular piece 72 and the cylinder 16. So that the O-ring 74 is not sheared off when the clutch-release mechanism is rotated during installation, a guide bevel (not shown) can be provided on the seat of the seal.

Figure 5:
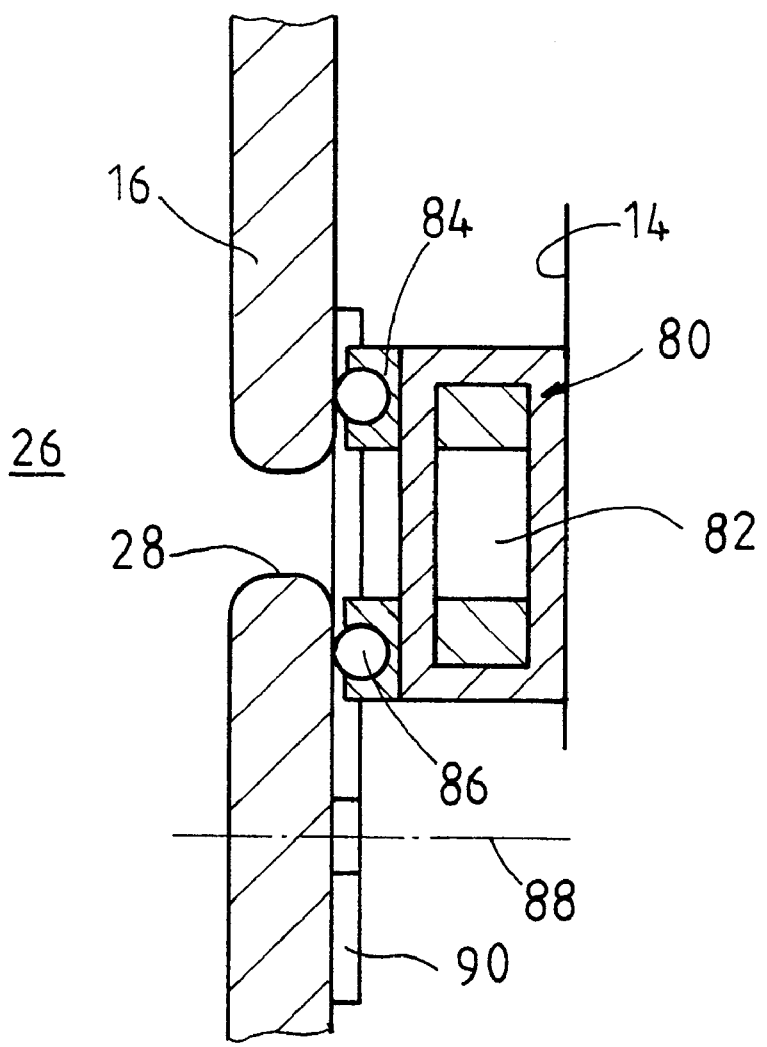
FIG. 5 shows a detailed view of a pneumatic/hydraulic interface according to a second embodiment.

FIG. 5 shows an alternative fluid connecting line 80, which, in contrast to the circular fluid connecting line 30, which extends from the tubular piece 72 through an opening 76 in the transmission end wall 14 and then onward through the interior of the transmission housing, as shown in FIG. 1, comprises an essentially rectangular channel 82, which extends from the opening 28 between the cylinder 16 and the transmission end wall 14 to the outside edge of the transmission end wall 14. As in the embodiment according to FIG. 1, the fluid connecting line 80 also has a round, tubular piece 84 for connecting the channel 82 to the opening 28, this tubular piece 84 being sealed off by an O-ring 86 against the cylinder 16. In addition, a protective cover 90, which can rotate around a center point 88, is also provided in this embodiment.

Figure 6:
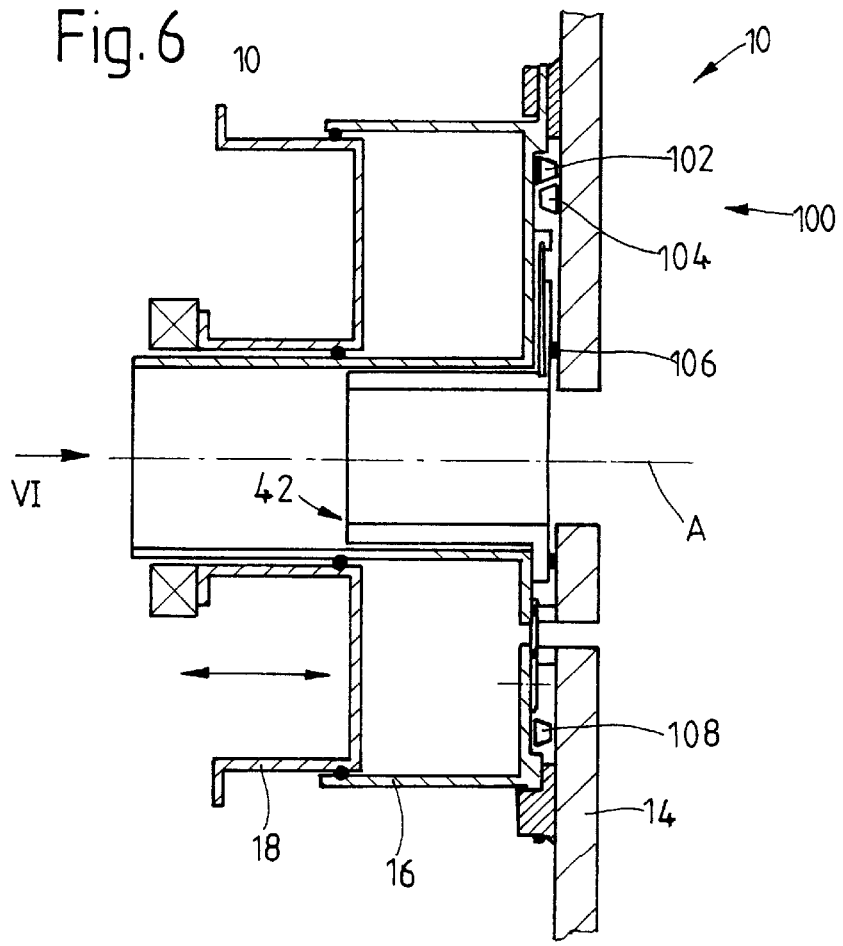
FIG. 6 shows a longitudinal view according to FIG. 1 of an additional connecting arrangement according to the invention for a clutch-release mechanism.
Figure 7:
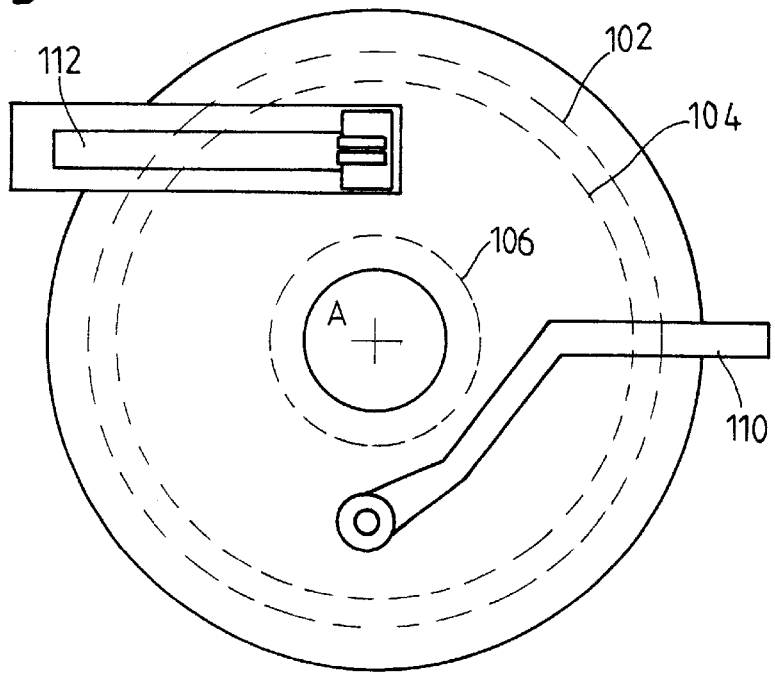
FIG. 7 shows a schematic end view of the connecting arrangement in direction VI of FIG. 6, after removal of the release mechanism, to show the arrangement of the labyrinth seal and the connecting means.

FIGS. 6 and 7 show an alternative embodiment, which differs from the embodiment of FIG. 1 only in that an additional sealing arrangement 100 is provided, which seals off the adjacent areas of the clutch-release mechanism 12 and the transmission end wall 14. The sealing arrangement 100 comprises, in the area of the connecting arrangement 10, an outer sealing ring 102 attached to the cylinder 16, a second sealing ring 104 which is offset in the direction of the axis of rotation, and attached to the transmission end wall 14, and a third sealing ring 106, which is provided in the area of the sensor system 42 on the transmission end wall 14. The sealing rings 102, 104, and 106 can, for example, be designed as labyrinth seals; or only a single sealing ring 108 can be provided in the area of the outer circumference of the cylinder 16, as shown in the lower half of FIG. 6.

The present invention thus provides a connecting arrangement for a clutch-release mechanism which is simple in design and which, by the use of known contact technologies, makes it possible to connect the pairs of contact elements easily and precisely in an extremely small amount of axial space without the danger of damage to the contact points. It is also possible to attach the clutch-release mechanism easily to the associated support element without the use of special tools.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed formic or embodiment of the invention may be incorporated in any other disclosed or described or suggested form or embodiment as a general matter of design choice. It is the intention, therefore, to be limited only as indicated by the scope of the claims appended hereto.

I claim:

1. A connecting arrangement for a clutch release mechanism which is designed for mounting concentrically to a longitudinal axis of a clutch apparatus, said connecting arrangement comprising:
   a sensor system:
   at least one connecting line which can be connected to the clutch release mechanism for the purpose of control, said at least one connecting line comprising at least one sensor connecting line connected to said sensor system; and
   fastening means for detachably connecting said clutch release mechanism to a support element, said fastening means producing and reversing a connection by relative rotation between said clutch release mechanism and said support element,
   wherein each said sensor connecting line comprises a spring loaded electrical contact fixed to said support element and a spring loaded electrical contact fixed to said clutch release mechanism, said spring loaded electrical contacts cooperating to complete said sensor connecting line.

2. A connecting arrangement as in claim 1 wherein said fastening means comprises at least one vane on one of said clutch release mechanism and said support element, and at least one vane receiving element on the other of said clutch release mechanism and said support element, each said vane receiving element receiving a respective said vane.

3. A connecting arrangement as in claim 2 wherein said vanes are designed as integral parts of said clutch release mechanism.

4. A connecting arrangement as in claim 2 further comprising means for securing each said at least one vane in the respective vane-receiving element.

5. A connecting arrangement as in claim 1 wherein said clutch release mechanism comprises one of a pneumatically and a hydraulically actuated piston-cylinder arrangement, said at least one connecting line comprising a fluid connecting line connected to said piston-cylinder arrangement.

6. A connecting arrangement as in claim 1 wherein said at least one sensor connecting line comprises a sheathed flexible conductive track.

7. A connecting arrangement as in claim 1 wherein each said at least one connecting line comprises a connector fixed to said support element and an opposing connector fixed to said clutch release mechanism, said connectors being engageable to complete said connecting line.

8. A connecting arrangement as in claim 7 wherein said connectors engage to complete said connecting line when said clutch release mechanism is rotated to connect with said support element.

9. A connecting arrangement as in claim 7 wherein each said connecting line comprises a sealing mechanism which covers one of said connector and said opposing connector when said clutch release mechanism is not connected to said support element.

10. A connecting arrangement as in claim 9 wherein said sealing mechanism comprises one of a swiveling shutter and a slider.

11. A connecting arrangement as in claim 9 wherein said sealing mechanism is opened by the rotational movement which effects connection of the clutch release mechanism to the support element.

12. A connecting arrangement as in claim 9 wherein said sealing mechanism comprises a protective film which is peeled off before said clutch release mechanism is connected to the support element.

13. A connecting arrangement as in claim 9 further comprising a cover which covers at least part of the sealing mechanism when the clutch mechanism is not connected to the support element.

14. A connecting arrangement as in claim 1 further comprising a labyrinth seal which is effective between said clutch release mechanism and said support element when said clutch release mechanism is connected to said support element.

15. A connecting arrangement as in claim 1 said fastening means on said support element and at least part of said at least one connecting line form a single assembly.

16. A clutch system comprising:
   a clutch release mechanism designed for mounting concentrically to a longitudinal axis of a clutch apparatus,
   a sensor system;
   a connecting arrangement for connecting said clutch release mechanism to a support element, said connecting arrangement comprising at least one connecting line which can be connected to the clutch release mechanism for the purpose of control, said at least one connecting line comprising at least one sensor connecting line connected to said sensor system; and
   fastening means for detachably connecting said clutch release mechanism to a support element, said fastening means producing and reversing a connection by relative rotation between said clutch release mechanism and said support element,
   wherein each said sensor connecting line comprises a spring loaded electrical contact fixed to said support element and a spring loaded electrical contact fixed to said clutch release mechanism, said spring loaded electrical contacts cooperating to complete said sensor connecting line.

17. A connecting arrangement for a clutch release mechanism which is designed for mounting concentrically to a longitudinal axis of a clutch apparatus, said connecting arrangement comprising:
   at least one connecting line which can be connected to the clutch release mechanism for the purpose of control, and
   fastening means for detachably connecting said clutch release mechanism to a support element, said fastening means producing and reversing a connection by relative rotation between said clutch release mechanism and said support element,
   wherein each said at least one connecting line comprises a connector fixed to said support element and an opposing connector fixed to said clutch release mechanism, said connectors engaging to complete said connecting line when said clutch release mechanism is rotated to connect with said support element.

18. A connecting arrangement as in claim 17 wherein said fastening means comprises at least one vane on one of said clutch release mechanism and said support element, and at least one vane receiving element on the other of said clutch release mechanism and said support element, each said vane receiving element receiving a respective said vane.

19. A connecting arrangement as in claim 18 wherein said vanes are designed as integral parts of said clutch release mechanism.

20. A connecting arrangement as in claim 18 further comprising means for securing each said at least one vane in the respective vane-receiving element.

21. A connecting arrangement as in claim 17 wherein said clutch release mechanism comprises one of a pneumatically and a hydraulically actuated piston-cylinder arrangement, said at least one connecting line comprising a fluid connecting line connected to said piston-cylinder arrangement.

22. A connecting arrangement as in claim 17 wherein each said connecting line comprises a sealing mechanism which covers one of said connector and said opposing connector when said clutch release mechanism is not connected to said support element.

23. A connecting arrangement as in claim 22 wherein said sealing mechanism comprises one of a swiveling shutter and a slider.

24. A connecting arrangement as in claim 22 wherein said sealing mechanism is opened by the rotational movement which effects connection of the clutch release mechanism to the support element.

25. A connecting arrangement as in claim 22 wherein said sealing mechanism comprises a protective film which is peeled off before said clutch release mechanism is connected to the support element.

26. A connecting arrangement as in claim 22 further comprising a cover which covers at least part of the sealing mechanism when the clutch mechanism is not connected to the support element.

27. A connecting arrangement as in claim 17 further comprising a labyrinth seal which is effective between said clutch release mechanism and said support element when said clutch release mechanism is connected to said support element.

28. A connecting arrangement as in claim 17 said fastening means on said support element and at least part of said at least one connecting line form a single assembly.

29. A clutch system comprising:

a clutch release mechanism designed for mounting concentrically to a longitudinal axis of a clutch apparatus, and a connecting arrangement for connecting said clutch release mechanism to a support element, said connecting arrangement comprising at least one connecting line which can be connected to the clutch release mechanism for the purpose of control, and fastening means for detachably connecting said clutch release mechanism to a support element, said fastening means producing and reversing a connection by relative rotation between said clutch release mechanism and said support element, wherein each said at least one connecting line comprises a connector fixed to said support element and an opposing connector fixed to said clutch release mechanism, said connectors engaging to complete said connecting line when said clutch release mechanism is rotated to connect with said support element.

* * * * *